US012638938B2

(12) United States Patent     (10) Patent No.:   US 12,638,938 B2
Tang     (45) Date of Patent:    May 26, 2026

(54) TOUCH CONTROL PANEL, METHOD FOR REPAIRING TOUCH CONTROL PANEL, DISPLAY PANEL, AND DISPLAY APPARATUS

(71) Applicant: Wuhan Tianma Microelectronics Co., Ltd., Wuhan (CN)

(72) Inventor: Shunqi Tang, Wuhan (CN)

(73) Assignee: WUHAN TIANMA MICROELECTRONICS CO., LTD., Wuhan (CN)

( * ) Notice: Subject to any disclaimer, the term of this patent is extended or adjusted under 35 U.S.C. 154(b) by 0 days.

(21) Appl. No.: 18/900,748

(22) Filed: Sep. 29, 2024

(65) Prior Publication Data

US 2025/0362772 A1     Nov. 27, 2025

(30) Foreign Application Priority Data

May 27, 2024    (CN) .......................... 202410667106.0

(51) Int. Cl.
*G06F 3/041*      (2006.01)
*G06F 3/044*      (2006.01)

(52) U.S. Cl.
CPC ........ *G06F 3/0418* (2013.01); *G06F 3/04164* (2019.05); *G06F 3/0446* (2019.05); *G06F 2203/04111* (2013.01)

(58) Field of Classification Search
CPC .. G06F 3/0418; G06F 3/04164; G06F 3/0446; G06F 2203/04111
See application file for complete search history.

(56) References Cited

U.S. PATENT DOCUMENTS

| | | | | |
|---|---|---|---|---|
| 10,152,147 B2 * | 12/2018 | Choi | ...................... | G06F 3/0443 |
| 11,360,619 B2 * | 6/2022 | Ma | ........................ | G06F 3/0443 |
| 11,508,790 B2 * | 11/2022 | Kim | .................... | G06F 3/04164 |
| 2010/0085326 A1 * | 4/2010 | Anno | ................. | H03K 17/9622 |
| | | | | 345/174 |
| 2010/0253646 A1 * | 10/2010 | Hiratsuka | ............. | G06F 3/0446 |
| | | | | 345/174 |
| 2013/0106747 A1 * | 5/2013 | Choi | ...................... | G06F 3/0446 |
| | | | | 345/173 |
| 2014/0028599 A1 * | 1/2014 | Jeong | ...................... | G06F 3/047 |
| | | | | 345/173 |

(Continued)

*Primary Examiner* — Amy Onyekaba
(74) *Attorney, Agent, or Firm* — East IP P.C.

(57) ABSTRACT

The application relates to a touch control panel and a method for repairing the touch control panel. The touch control panel includes a touch control area and a peripheral area including a routing area and a binding area, and further includes touch control electrode groups and touch control wirings. The touch control electrode groups are arranged in the touch control area, and each touch control electrode group includes one or more touch control electrodes. The touch control wirings are arranged in the peripheral area, each touch control electrode group is connected with the exterior through the touch control wiring, at least one touch control wiring includes first and second wirings electrically connected with corresponding touch control electrode groups, the first and second wirings extend from the routing area to the binding area, and the second wiring is to be electrically connected with the first wiring located in the binding area.

20 Claims, 8 Drawing Sheets

(56)  References Cited

U.S. PATENT DOCUMENTS

| | | | |
|---|---|---|---|
| 2016/0188114 A1* | 6/2016 | Kim | G06F 3/0418 |
| | | | 345/174 |
| 2016/0195967 A1* | 7/2016 | Lee | G06F 3/0443 |
| | | | 345/173 |
| 2018/0033831 A1* | 2/2018 | An | H10K 59/87 |
| 2019/0294278 A1* | 9/2019 | Kim | G06F 3/04164 |
| 2020/0293134 A1* | 9/2020 | Shim | G06F 3/0445 |
| 2021/0223910 A1* | 7/2021 | Yang | G06F 3/0412 |
| 2021/0247866 A1* | 8/2021 | Kim | G06F 3/04164 |
| 2021/0255736 A1* | 8/2021 | Kim | G06F 3/0446 |
| 2022/0035485 A1* | 2/2022 | Cui | G06F 3/0443 |
| 2022/0253181 A1* | 8/2022 | Ouyang | G06F 3/0446 |
| 2022/0308728 A1* | 9/2022 | Zheng | G06F 3/0446 |
| 2022/0413656 A1* | 12/2022 | Wang | G06F 3/0443 |
| 2024/0032350 A1* | 1/2024 | Ye | G06F 3/04164 |
| 2024/0138217 A1* | 4/2024 | Tabatake | G06F 3/0443 |
| 2024/0184388 A1* | 6/2024 | Ye | G06F 3/0446 |
| 2024/0281088 A1* | 8/2024 | Tong | G06F 3/041 |
| 2025/0031548 A1* | 1/2025 | Tabatake | G09G 3/006 |
| 2025/0224833 A1* | 7/2025 | Park | G06F 3/04164 |

* cited by examiner

200

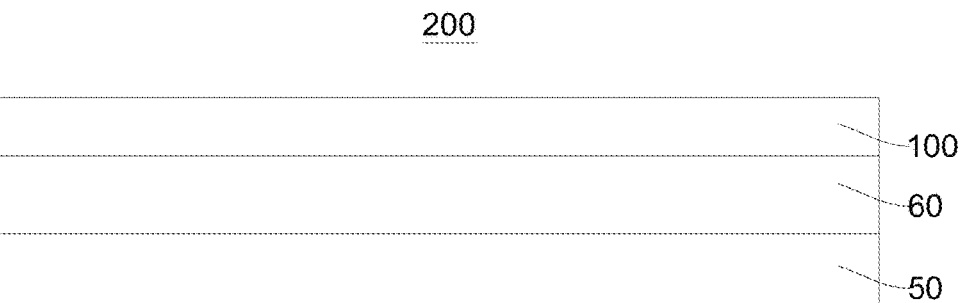

Fig. 11

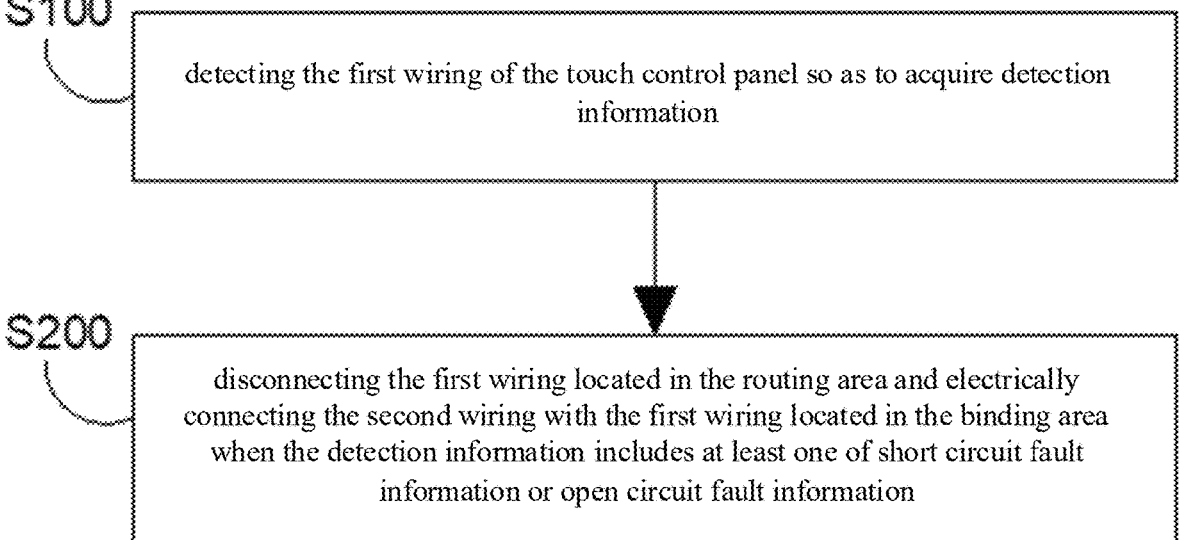

S100 detecting the first wiring of the touch control panel so as to acquire detection information

S200 disconnecting the first wiring located in the routing area and electrically connecting the second wiring with the first wiring located in the binding area when the detection information includes at least one of short circuit fault information or open circuit fault information

Fig. 12

TOUCH CONTROL PANEL, METHOD FOR REPAIRING TOUCH CONTROL PANEL, DISPLAY PANEL, AND DISPLAY APPARATUS

CROSS-REFERENCE TO RELATED APPLICATIONS

This application claims priority to Chinese Patent Application No. 202410667106.0, titled "TOUCH CONTROL PANEL, METHOD FOR REPAIRING TOUCH CONTROL PANEL, DISPLAY PANEL, AND DISPLAY APPARATUS" and filed on May 27, 2024, which is hereby incorporated by reference in its entirety.

TECHNICAL FIELD

The present application relates to the field of display technology, and particularly relates to a touch control panel, a method for repairing the touch control panel, a display panel, and a display apparatus.

BACKGROUND

In today's consumer electronics market, incorporation of touch control functions into displays has become a main development trend of portable electronic products. Touch control panels have been used in a variety of electronic products, such as smart phones, mobile phones, tablet computers, and notebook computers. Since the user can directly perform operations and give instructions through the objects displayed on the screen, the touch control panel provides a user-friendly operation interface between the user and the electronic product.

Meanwhile, the reliability of touch control wirings in the touch control panel is one of the research directions of the touch control panel.

SUMMARY

Embodiments of the present application provide a touch control panel, a method for repairing the touch control panel, a display panel, and a display apparatus, which can effectively improve the reliability of the touch control wiring.

In a first aspect, a touch control panel is provided according to embodiments of the present application. The touch control panel includes a touch control area and a peripheral area surrounding the touch control area, the peripheral area includes a routing area arranged around the touch control area and a binding area located at a side of the routing area away from the touch control area, and the touch control panel further includes: a plurality of touch control electrode groups arranged in the touch control area, each of the touch control electrode groups including one or more touch control electrodes; and a plurality of touch control wirings arranged in the peripheral area, each of the touch control electrode groups being connected with the exterior through the touch control wiring, at least one of the plurality of touch control wirings including a first wiring and a second wiring, the first wiring being electrically connected with a touch control electrode group corresponding to the first wiring, the second wiring being electrically connected with a touch control electrode group corresponding to the second wiring, the first wiring extending from the routing area to the binding area, the second wiring extending from the routing area to the binding area, and the second wiring being configured to be electrically connected with the first wiring located in the binding area.

In a second aspect, embodiments of the present application further provide a display panel, including the above touch control panel.

In a third aspect, embodiments of the present application further provide a display apparatus, including the above touch control panel.

In a fourth aspect, embodiments of the present application further provide a method for repairing the above touch control panel, including: detecting the first wiring of the touch control panel to acquire detection information; disconnecting the first wiring located in the routing area and electrically connecting the second wiring with the first wiring located in the binding area when the detection information includes at least one of short circuit fault information or open circuit fault information.

According to the touch control panel, the method for repairing the touch control panel, the display panel, and the display apparatus provided by the present application, the touch control panel includes the touch control wiring and the touch control electrode, and the touch control wiring is electrically connected with the touch control electrode to transmit a touch control signal to the touch control electrode. The touch control wiring includes the first wiring and the second wiring. The first wiring may be configured to transmit the touch control signal in a normal state. When the first wiring cannot normally transmit the touch control signal due to a short circuit, an open circuit, or other problems in the first wiring, the second wiring may be used to transmit the touch control signal to the touch control electrode, so as to reduce the possibility that the touch control function cannot be realized in the touch control panel due to the fault in the first wiring, and improve the reliability of the touch control wiring.

BRIEF DESCRIPTION OF THE DRAWINGS

The features, advantages and technical effects of exemplary embodiments of the present application will be described below with reference to the accompanying drawings.

FIG. 11 shows a schematic structural diagram of a display panel according to some embodiments of the present application;

FIG. 12 shows a flow chart of a method for repairing the touch control panel according to some embodiments of the present application.

REFERENCE NUMERALS

Figure 1:
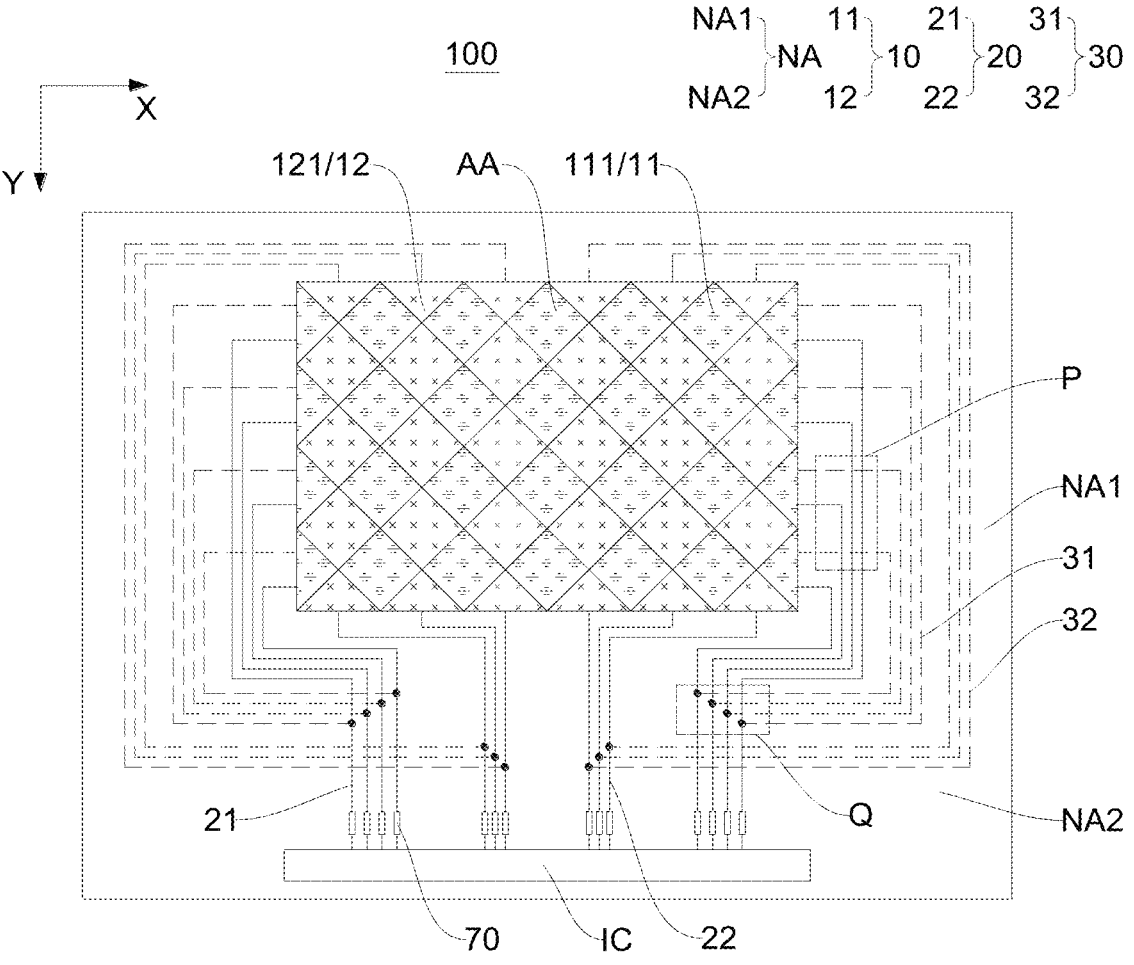
FIG. 1 shows a schematic structural top view of a touch control panel according to some embodiments of the present application.

100, touch control panel; 200, display panel;

AA, touch control area; NA, peripheral area; NA1, routing area; NA2, binding area; CR1, first overlapping area; CR2, second overlapping area;

10, touch control electrode group; 11, first electrode group; 111, first touch control electrode; 12, second electrode group; 121, second touch control electrode;

20, first wiring; 21, first touch control circuit; 22, second touch control circuit; 23, first branch circuit; 24, second branch circuit;

30, second wiring; 31, first repair circuit; 32, second repair circuit; 33, third branch circuit; 34, fourth branch circuit; 35, first portion; 36, second portion; 37, separation portion;

40, recess;

50, base plate;

60, display layer;

70, binding terminal;

IC, control chip;

K1, first bridge portion; K2, second bridge portion; K3, third bridge portion; K4, fourth bridge portion;

M1, first conductor layer; M2, second conductor layer;

X, first direction; Y, second direction; Z, thickness direction.

In the accompanying drawings, the same reference numerals are used for the same components. The accompanying drawings are not drawn to actual scale.

DETAILED DESCRIPTION

Features of various aspects and exemplary embodiments of the present invention will be described in detail below. In order to make objects, technical solutions and advantages of the present application clearer, the present application is further described in detail below with reference to the accompanying drawings and specific embodiments. It should be understood that the specific embodiments described herein are only used to explain the present application, but not to limit the present application. For those skilled in the art, the present application can be implemented without some of these specific details. The following description of the embodiments is only to provide a better understanding of the present application by illustrating examples of the present application.

It should be noted that, in the present application, the relational terms, such as first and second, are used merely to distinguish one entity or operation from another entity or operation, without necessarily requiring or implying any actual such relationships or orders for these entities or operations. Moreover, the terms "comprise", "include", or any other variants thereof, are intended to represent a non-exclusive inclusion, such that a process, method, article or device comprising/including a series of elements includes not only those elements, but also other elements that are not explicitly listed or elements inherent to such a process, method, article or device. Without more constraints, the elements following an expression "comprise/include . . . " do not exclude the existence of additional identical elements in the process, method, article or device that includes the elements.

At present, a signal between a touch control electrode in a touch control panel and a control chip needs to be transmitted through a touch control wiring. In order to improve the production efficiency, touch control wirings of a plurality of touch control panels are usually manufactured on a touch control master mask. However, a fault such as a short circuit or an open circuit may occur between the touch control wirings due to process errors or other factors in the manufacturing process, which causes the failure of the touch control function and even affects other functions, and thus the manufacturing yield of the touch control panels is reduced, and the reliability of the touch control wiring is reduced.

FIG. 1 shows a schematic structural top view of a touch control panel according to some embodiments of the present application.

Figure 2:
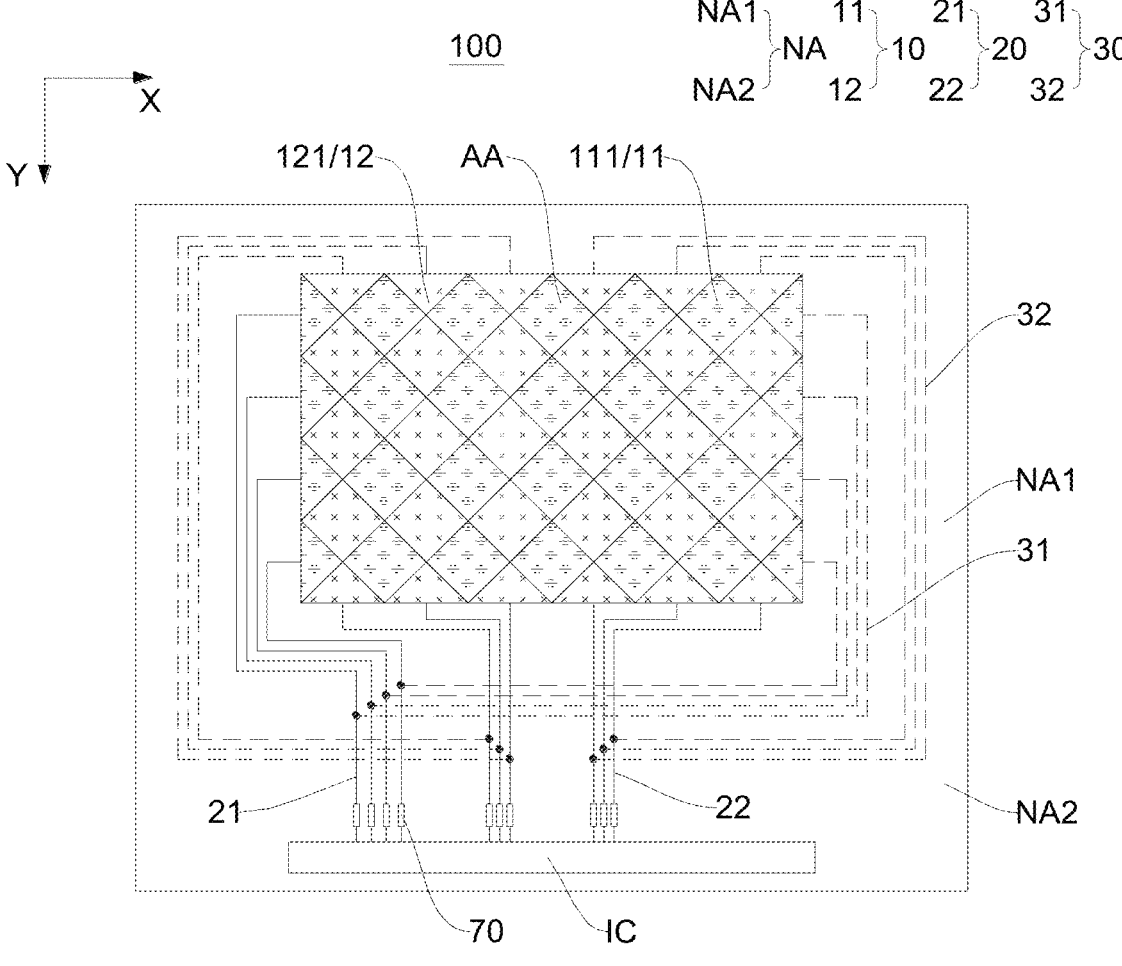
FIG. 2 shows a schematic structural top view of another touch control panel according to some embodiments of the present application.
Figure 10:
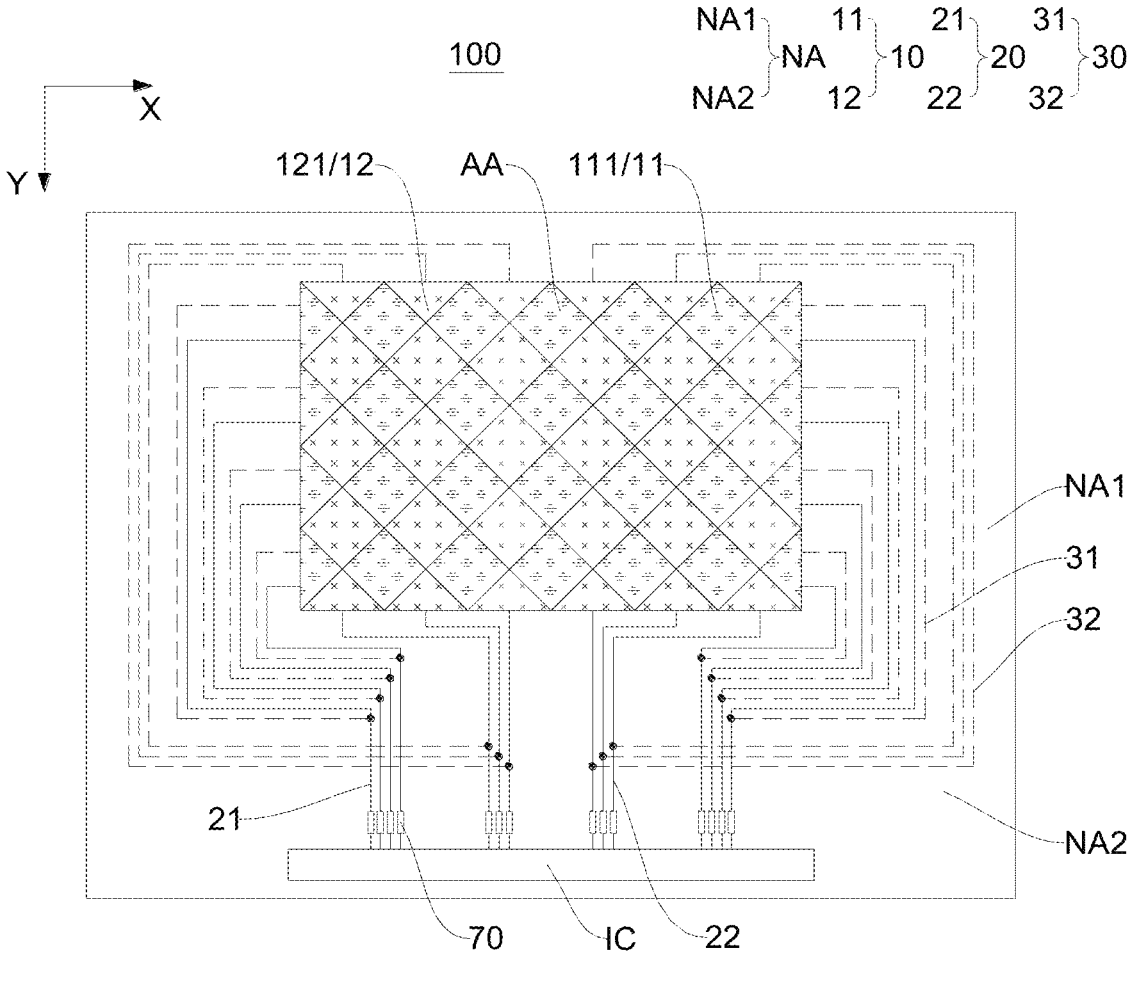
FIG. 10 shows a schematic structural top view of yet another touch control panel according to some embodiments of the present application.

It should be noted that the second wirings in FIGS. 1, 2, and 10 are indicated by dashed lines. In an actual product, both the second wiring and the first wiring are continuous conductor wirings.

As shown in FIG. 1, an embodiment of the present application provides a touch control panel 100. The touch control panel 100 includes a touch control area AA and a peripheral area NA surrounding the touch control area AA, and the peripheral area NA includes a routing area NA1 arranged around the touch control area AA and a binding area NA2 located at a side of the routing area NA1 away from the touch control area AA. The touch control panel 100 further includes a plurality of touch control electrode groups 10 and a plurality of touch control wirings. The plurality of touch control electrode groups 10 are arranged in the touch control area AA, and each of the touch control electrode groups 10 includes one or more touch control electrodes. The plurality of touch control wirings are arranged in the peripheral area NA, each of the touch control electrode groups 10 is connected with the exterior through the touch control wiring, at least one of the plurality of touch control wirings includes a first wiring 20 and a second wiring 30, the first wiring 20 is electrically connected with a touch control electrode group 10 corresponding to the first wiring 20, the second wiring 30 is electrically connected with a touch control electrode group 10 corresponding to the second wiring 30, the first wiring 20 extends from the routing area NA1 to the binding area NA2, the second wiring 30 extends from the routing area NA1 to the binding area NA2, and the second wiring 30 is configured to be electrically connected with the first wiring 20 located in the binding area NA2.

The touch control panel 100 includes the touch control area AA and the peripheral area NA, the touch control area AA is used for realizing the touch control function. The touch control electrode group 10 is arranged in the touch control area AA, performs touch control positioning by means of self-capacitance or mutual-capacitance, and may transmit a touch control signal to a control chip IC of the touch control panel 100. Optionally, the touch control panel 100 may further include a display area and a non-display area, the non-display area is arranged around the display area, and the touch control area AA may include the entire display area. Of course, the touch control area AA may also include a portion of the non-display area. The peripheral area NA includes a routing area NA1 and a binding area NA2, the touch control wiring may be arranged in the routing area NA1, and the touch control wiring is configured to transmit a touch control signal to the touch control electrode. A binding terminal 70 may be provided in the binding area NA2 and configured to be electrically connected with the control chip IC in the touch control panel 100.

Optionally, the shape of the routing area NA1 can match the shape of the touch control area AA. Exemplarily, the shape of the touch control area AA is a rectangle, and the shape of the routing area NA1 is a rectangular ring; or the shape of the touch control area AA is a circle, and the shape of the routing area NA1 is a circular ring. Optionally, the binding area NA2 may be located at a side of a rectangular wide edge of the routing area NA1.

The touch control electrode group 10 is arranged in the touch control area AA, and may include one or more touch control electrodes. The touch control electrode groups 10 may be arranged side by side in a single direction or arranged in an array in a plurality of directions.

Each of the touch control electrode groups 10 is connected with the exterior through the touch control wiring. That is, each of the touch control electrode groups 10 may be connected with the exterior through one or more touch control wirings, in which "the exterior" refers to a device which is external to the touch control electrode group and may be electrically connected with the touch control wiring, such as the control chip IC in the touch control panel 100.

Optionally, some of the plurality of touch control wirings each include a first wiring 20 and a second wiring 30. Alternatively, each of the touch control wirings includes a first wiring 20 and a second wiring 30.

The first wiring 20 is electrically connected with a touch control electrode group 10 corresponding to the first wiring 20, the second wiring 30 is electrically connected with a touch control electrode group 10 corresponding to the second wiring 30. Under a condition that the touch control electrode group 10 includes one touch control electrode, each of the first wiring 20 and the second wiring 30 is electrically connected with the one touch control electrode. Under a condition that the touch control electrode group 10 includes a plurality of touch control electrodes, the plurality of touch control electrodes are electrically connected with each other, the first wiring 20 and the second wiring 30 may be electrically connected with a same touch control electrode of the plurality of touch control electrodes, or the first wiring 20 and the second wiring 30 may be electrically connected with two touch control electrodes of the plurality of touch control electrodes, respectively.

The first wiring 20 extends from the routing area NA1 to the binding area NA2, the second wiring 30 extends from the routing area NA1 to the binding area NA2, and the second wiring 30 is configured to be electrically connected with the first wiring 20 located in the binding area NA2. That is, one end of the first wiring 20 is electrically connected with the touch control electrode and extends from the routing area NA1 to the binding area NA2, a binding terminal 70 may be provided in the binding area NA2, and the other end of the first wiring 20 is electrically connected with the binding terminal 70. One end of the second wiring 30 is electrically connected with the touch control electrode and extends from the routing area NA1 to the binding area NA2, and the other end of the second wiring 30 is electrically connected with an area of the first wiring 20 close to the binding terminal 70. Optionally, the other end of the second wiring 30 may be electrically connected with the area of the first wiring 20 close to the binding terminal 70 directly. Of course, the other end of the second wiring 30 may be electrically connected with the area of the first wiring 20 close to the binding terminal 70 by means of repair through welding or other manners. The first wiring 20 extends from the junction of the binding area NA2 and the routing area NA1 into the binding area NA2 and is electrically connected with the binding terminal 70 at a preset position in the binding area NA2, in which the "area of the first wiring 20 close to the binding terminal 70" refers to the first wiring 20 located between the junction of the binding area NA2 and the routing area NA1 and the binding terminal 70. In some other examples, the other end of the second wiring 30 may also be electrically connected with the first wiring 20 located in the routing area NA1.

The touch control panel 100 according to the present application includes the touch control wiring and the touch control electrode, and the touch control wiring is electrically connected with the touch control electrode to transmit a touch control signal to the touch control electrode. The touch control wiring includes the first wiring 20 and the second wiring 30. The first wiring 20 may be configured to transmit the touch control signal in a normal state. When the first wiring 20 cannot normally transmit the touch control signal due to a short circuit, an open circuit, or other problems in the first wiring 20, the second wiring 30 may be used to transmit the touch control signal to the touch control electrode, so as to reduce the possibility that the touch control function cannot be realized in the touch control panel 100 due to the fault in the first wiring 20, and improve the reliability of the touch control wiring.

As shown in FIG. 1, in some optional embodiments, the touch control electrode group 10 includes a first electrode group 11 and a second electrode group 12, the first electrode group 11 includes one or more first touch control electrodes 111, the second electrode group 12 includes one or more second touch control electrodes 121, the first touch control electrode 111 and the second touch control electrode 121 are electrically insulated from each other, the first wiring 20 includes a first touch control circuit 21 and a second touch control circuit 22, and the second wiring 30 includes a first repair circuit 31 and a second repair circuit 32, in which the first touch control circuit 21 is electrically connected with the first electrode group 11, and the second touch control circuit 22 is electrically connected with the second electrode group 12. The first repair circuit 31 is electrically connected with at least a portion of the first electrode group 11, and the first repair circuit 31 is configured to be electrically connected with the first touch control circuit 21 located in the binding area NA2; and/or the second repair circuit 32 is electrically connected with at least a portion of the second electrode group 12, and the second repair circuit 32 is configured to be electrically connected with the second touch control circuit 22 located in the binding area NA2.

The touch control electrode group 10 includes the first electrode group 11 and the second electrode group 12 electrically insulated from each other.

In some examples, the touch control electrode includes a sensing electrode and a transmitting electrode. Accordingly, the touch control electrodes in the first electrode group 11 and the second electrode group 12 may transmit different types of signals. For example, the touch control electrode in the first electrode group 11 is a sensing electrode, and the touch control electrode in the second electrode group 12 is a transmitting electrode.

In order to facilitate understanding, the following description is provided by referring to an example embodiment in which each first electrode group 11 includes a plurality of first touch control electrodes 111 electrically connected with each other, and each second electrode group 12 includes a plurality of second touch control electrodes 121 electrically connected with each other.

The first wiring 20 includes the first touch control circuit 21 and the second touch control circuit 22, each first touch control circuit 21 is electrically connected with each first electrode group 11, and each second touch control circuit 22 is electrically connected with each second electrode group 12.

It should be noted that the first touch control circuit 21 and the second touch control circuit 22 in the first wiring 20 serve as a channel for transmitting electric signals between the control chip and the touch control electrode. The first touch control circuit 21 is taken as an example. When a fault such as a short circuit or an open circuit occurs in one first touch control circuit 21 in the first wiring 20, the fault such as a short circuit or an open circuit often occurs on an extension path on which the first touch control circuit 21 extends from the routing area NA1 to the binding area NA2. One end of the first repair circuit 31 in the second wiring 30 is electrically connected with the first electrode group 11, and the other end is electrically connected with the first touch control circuit 21 in the binding area NA2, so that when a fault such as a short circuit or an open circuit occurs in the first touch control circuit 21 located between the first electrode group 11 and a position where the first repair circuit 31 is electrically connected with the first touch control circuit 21 in the binding area NA2, the electric signal can be transmitted from the position where the first repair circuit 31 is electrically connected with the first touch control circuit 21 in the binding area NA2 to the first repair circuit 31. The first repair circuit 31 is used as the channel for transmission, which ensures the transmission of the electric signal between the control chip and the touch control electrode.

The first repair circuit 31 is electrically connected with at least a portion of the first electrode group 11, and the first repair circuit 31 is configured to be electrically connected with the first touch control circuit 21 located in the binding area NA2. Optionally, one end of each first repair circuit 31 is electrically connected with each first electrode group 11, or the first repair circuit 31 is electrically connected with a portion of the first electrode groups 11. The other end of the first repair circuit 31 is configured to be electrically connected with the first touch control circuit 21 located in the binding area NA2. Optionally, a number of the first repair circuits 31 may be the same as a number of the first touch control circuits 21. That is, each first repair circuit 31 and each first touch control circuit 21 are arranged in one-to-one correspondence, so that when a fault occurs in any one of the first touch control circuits 21, a first repair circuit 31 corresponding to the first touch control circuit 21 would repair the first touch control circuit 21 in which the fault occurs, so as to improve the reliability of the touch control function. Of course, the number of the first repair circuits 31 may be less than the number of the first touch control circuits 21. That is, a portion of the first touch control circuits 21 and a portion of the first repair circuits 31 are arranged in one-to-one correspondence, so that the first repair circuit 31 can repair a first touch control circuit 21 in which a fault often occurs according to design requirements, which is beneficial for reducing redundancy of the first repair circuits 31.

The second repair circuit 32 is electrically connected with at least a portion of the second electrode group 12, and the second repair circuit 32 is configured to be electrically connected with the second touch control circuit 22 located in the binding area NA2. Optionally, one end of each second repair circuit 32 is electrically connected with each second electrode group 12, or the second repair circuit 32 is electrically connected with a portion of the second electrode groups 12. The other end of the second repair circuit 32 is configured to be electrically connected with the second touch control circuit 22 located in the binding area NA2. Optionally, a number of the second repair circuits 32 may be the same as a number of the second touch control circuits 22. That is, each second repair circuit 32 and each second touch control circuit 22 are arranged in one-to-one correspondence, so that when a fault occurs in any one of the second touch control circuits 22, a second repair circuit 32 corresponding to the second touch control circuit 22 would repair the second touch control circuit 22 in which the fault occurs, so as to improve the reliability of the touch control function. Of course, the number of the second repair circuits 32 may be less than the number of the second touch control circuits 22. That is, a portion of the second touch control circuits 22 and a portion of the second repair circuits 32 are arranged in one-to-one correspondence, so that the second repair circuit 32 can repair a second touch control circuit 22 in which a fault often occurs according to design requirements, which is beneficial for reducing redundancy of the second repair circuits 32.

In some examples, the second wiring 30 may include only the first repair circuit 31. In other examples, the second wiring 30 may also include only the second repair circuit 32. In other examples, the second wiring 30 includes the first repair circuit 31 and the second repair circuit 32.

In these optional embodiments, the first repair circuit 31 and the second repair circuit 32 are provided, so that when a fault such as a short circuit or an open circuit occurs in the first touch control circuit 21 and the second touch control circuit 22, the first repair circuit 31 and the second repair circuit 32 can be enabled to replace the first touch control circuit 21 and the second touch control circuit 22 for operation, so as to reduce the possibility that the touch control panel 100 cannot operate normally due to the failure of the touch control function when a fault occurs in the first wiring 20, thereby improving the reliability of the touch control panel 100.

As shown in FIG. 1, in some optional embodiments, the first electrode group 11 includes a plurality of first touch control electrodes 111 connected with each other, the plurality of first touch control electrodes 111 are distributed in sequence along a first direction X, the second electrode group 12 includes a plurality of second touch control electrodes 121 connected with each other, the plurality of second touch control electrodes 121 are distributed in sequence along a second direction Y, a plurality of first electrode groups 11 are distributed at intervals along the second direction Y, a plurality of second electrode groups 12 are distributed at intervals along the first direction X and are spaced apart from the plurality of first electrode groups 11, and the first direction X intersects with the second direction Y. Herein, the binding area NA2 is located at a side of the touch control area AA along the second direction Y, the second touch control circuit 22 is electrically connected with a second touch control electrode 121 at a side close to the binding area NA2, and the second repair circuit 32 is electrically connected with a second touch control electrode 121 at a side away from the binding area NA2.

The first electrode group 11 includes the plurality of first touch control electrodes 111 connected with each other, the plurality of first touch control electrodes 111 are distributed in sequence along the first direction X, the second electrode group 12 includes the plurality of second touch control electrodes 121 connected with each other, the plurality of second touch control electrodes 121 are distributed in sequence along the second direction Y, the plurality of first electrode groups 11 are distributed at intervals along the second direction Y, and the plurality of second electrode groups 12 are distributed at intervals along the first direction X and are spaced apart from the plurality of first electrode groups 11. In other words, the plurality of first touch control electrodes 111 and the plurality of second touch control electrodes 121 may be arranged in an array along the first direction X and the second direction Y. In the first direction X, i.e., a row direction, each row of first touch control electrodes 111 are electrically connected with each other to form the first electrode group 11, and each row of second touch control electrodes 121 are electrically insulated from each other. In the second direction Y, i.e., a column direction, each column of first touch control electrodes 111 are electrically insulated from each other, and each column of second touch control electrodes 121 are electrically connected with each other to form the second electrode group 12.

For example, the shape of the touch control area AA is a rectangle. The touch control area AA has edges at two opposite sides along the second direction Y, and the binding area NA2 is located at an edge at one of the sides. The second touch control circuit 22 is electrically connected with a second touch control electrode 121 at a side close to the binding area NA2, and the second repair circuit 32 is electrically connected with a second touch control electrode 121 at a side away from the binding area NA2. That is, the second touch control circuit 22 is located at an edge at the side close to the binding area NA2, and the second repair circuit 32 is located at an edge at the side away from the binding area NA2. Moreover, in one second electrode group 12, a plurality of second touch control electrodes 121 are distributed in sequence along the second direction Y, in which a second touch control electrode 121 close to the binding area NA2 is electrically connected with the second touch control circuit 22, and a second touch control electrode 121 away from the binding area NA2 is electrically connected with the second repair circuit 32, so as to reduce a number of routings in an area between the binding area NA2 and the touch control area AA along the second direction Y, thereby reducing routing difficulty and improving production efficiency.

As shown in FIG. 1, in some optional embodiments, both sides of each of the first electrode groups 11 along the first direction X are provided with the first touch control circuit 21 and the first repair circuit 31.

It can be seen from the foregoing that the first touch control electrodes 111 and the second touch control electrodes 121 are arranged in an array, one first touch control electrode 111 is provided at each of edges at two opposite sides of each row of first touch control electrodes 111 along the first direction X, and both of the two first touch control electrodes 111 in each row may be electrically connected with one first touch control circuit 21 and one repair circuit, so that each first electrode group 11 is electrically connected with two first touch control circuits 21 and two first repair circuits 31, and then the two first touch control circuits 21 can improve the transmission speed of the touch control signal, and the two first repair circuits 31 can repair the two first touch control circuits 21, and thus the transmission speed of the touch control signal can still be guaranteed to be within a specified range when a fault occurs in one or two of the first touch control circuits 21, so as to improve the reliability of the touch control panel 100.

FIG. 2 shows a schematic structural top view of another touch control panel according to some embodiments of the present application.

As shown in FIG. 2, in some optional embodiments, one side of each of the first electrode groups 11 along the first direction X is provided with the first touch control circuit 21, and the other side of each of the first electrode groups 11 along the first direction X is provided with the first repair circuit 31.

It can be seen from the foregoing that the first touch control electrodes 111 and the second touch control electrodes 121 are arranged in an array, one first touch control electrode 111 is provided at each of edges at two opposite sides of each row of first touch control electrodes 111 along the first direction X, one of the two first touch control electrodes 111 in each row may be electrically connected with the first touch control circuit 21, and the other of the two first touch control electrodes 111 in each row may be electrically connected with the first repair circuit 31, so that each first electrode group 11 is electrically connected with one first touch control circuit 21 and one first repair circuit 31, so as to reduce the number of the first touch control circuits 21 and the number of the first repair circuits 31, reduce the space occupied by the first touch control circuit 21 and the first repair circuit 31 in the routing area NA1, and thus reduce the overall area of the routing area NA1 and improve the proportion of the touch control area AA in the touch control panel 100.

Figure 3:
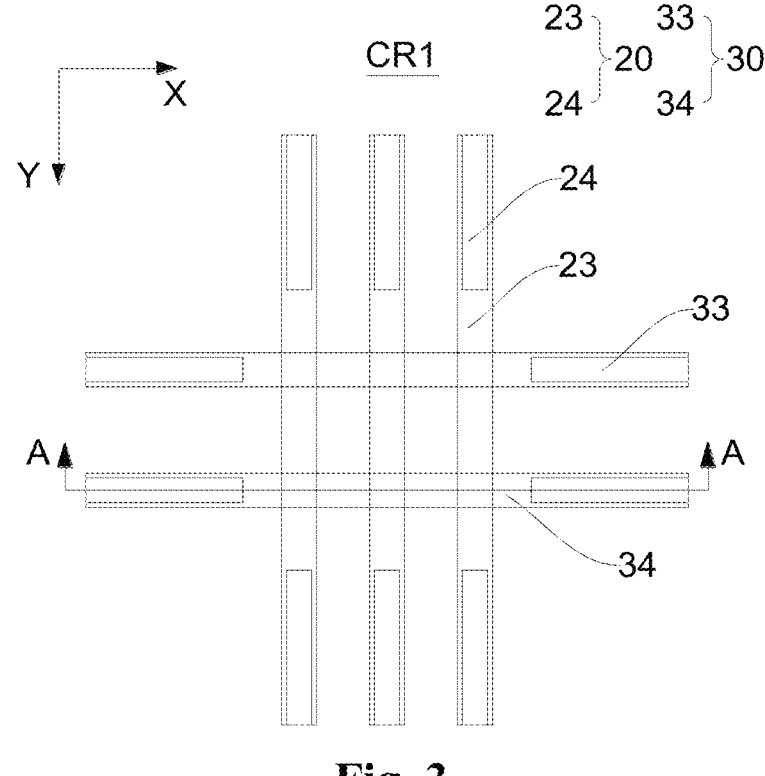
FIG. 3 shows an enlarged schematic structural view of P in FIG. 1.
Figure 4:
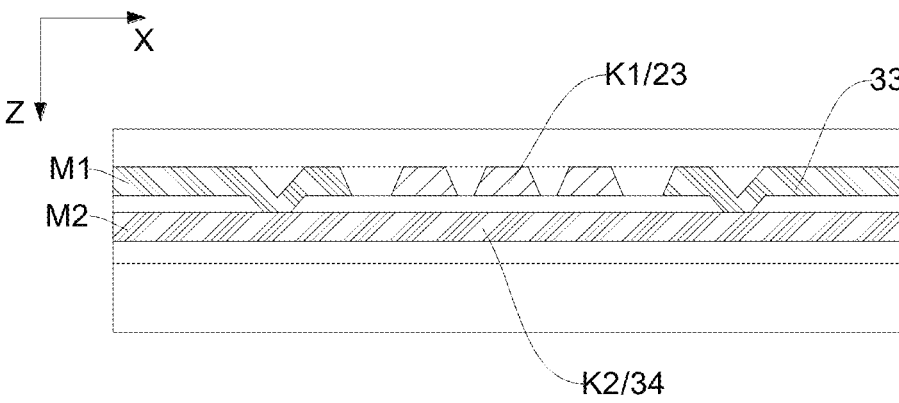
FIG. 4 shows a sectional schematic structural view along A-A in FIG. 3.

As shown in FIGS. 1, 3, and 4, in some optional embodiments, the touch control panel 100 includes a first conductor layer M1 and a second conductor layer M2 that are stacked. The first wiring 20 is arranged in at least one of the first conductor layer M1 or the second conductor layer M2, and/or the second wiring 30 is arranged in at least one of the first conductor layer M1 or the second conductor layer M2.

In some examples, the first wiring 20 is only arranged in the first conductor layer M1. In some other examples, the first wiring 20 is only arranged in the second conductor layer M2. In some other examples, each of the first conductor layer M1 and the second conductor layer M2 is provided with the first wiring 20. Optionally, the first wiring 20 in the first conductor layer M1 and the first wiring 20 in the second conductor layer M2 may be configured to be electrically connected with a same first electrode group 11. Alternatively, the first wiring 20 in the first conductor layer M1 and the first wiring 20 in the second conductor layer M2 are electrically connected with different first electrode groups 11, respectively.

In some examples, the second wiring 30 is only arranged in the first conductor layer M1. In some other examples, the second wiring 30 is only arranged in the second conductor layer M2. In some other examples, each of the first conductor layer M1 and the second conductor layer M2 is provided with the second wiring 30. Optionally, the second wiring 30 in the first conductor layer M1 and the second wiring 30 in the second conductor layer M2 may be configured to be electrically connected with a same second electrode group 12. Alternatively, the second wiring 30 in the first conductor layer M1 and the second wiring 30 in the second conductor layer M2 are electrically connected with different second electrode groups 12, respectively.

In these optional embodiments, the first conductor layer M1 and the second conductor layer M2 are provided to improve the flexibility of the routing of the touch control wirings, reduce the possibility of interference between the touch control wirings, and improve the manufacturing yield of the touch control wirings.

FIG. 3 shows an enlarged schematic structural view of P in FIG. 1. FIG. 4 shows a sectional schematic structural view along A-A in FIG. 3.

As shown in FIGS. 3 and 4, in some optional embodiments, the first wiring 20 includes a first branch circuit 23 and a second branch circuit 24, the second wiring 30 includes a third branch circuit 33 and a fourth branch circuit 34, both the first branch circuit 23 and the third branch circuit 33 are arranged in the first conductor layer M1, and both the second branch circuit 24 and the fourth branch circuit 34 are arranged in the second conductor layer M2. Herein, a projection of the first branch circuit 23 along a thickness direction Z of the touch control panel 100 at least partially overlaps a projection of the second branch circuit 24 along the thickness direction Z of the touch control panel 100, and a projection of the third branch circuit 33 along the thickness direction Z of the touch control panel 100 at least partially overlaps a projection of the fourth branch circuit 34 along the thickness direction Z of the touch control panel 100.

The first wiring 20 includes the first branch circuit 23 and the second branch circuit 24. That is, one first electrode group 11 needs to be electrically connected with the first touch control circuit 21, and the first touch control circuit 21 connected with the one first electrode group 11 includes the first branch circuit 23 and the second branch circuit 24. One second electrode group 12 needs to be electrically connected with the second touch control circuit 22, and the second touch control circuit 22 connected with the one second electrode group 12 includes the first branch circuit 23 and the second branch circuit 24. It can be understood that the first branch circuit 23 and the second branch circuit 24 included in the first touch control circuit 21 and the first branch circuit 23 and the second branch circuit 24 included in the second touch control circuit 22 are electrically insulated from each other.

The second wiring 30 includes the third branch circuit 33 and the fourth branch circuit 34. That is, one first electrode group 11 needs to be electrically connected with the first repair circuit 31, and the first repair circuit 31 connected with the one first electrode group 11 includes the third branch circuit 33 and the fourth branch circuit 34. One second electrode group 12 needs to be electrically connected with the second repair circuit 32, and the second repair circuit 32 connected with the one second electrode group 12 includes the third branch circuit 33 and the fourth branch circuit 34. It can be understood that the third branch circuit 33 and the fourth branch circuit 34 included in the first repair circuit 31 and the third branch circuit 33 and the fourth branch circuit 34 included in the second repair circuit 32 are electrically insulated from each other.

The first branch circuit 23 and the third branch circuit 33 are arranged in the first conductor layer M1, and the second branch circuit 24 and the fourth branch circuit 34 are arranged in the second conductor layer M2. That is, the first branch circuit 23 and the third branch circuit 33 are arranged in a same layer, and the second branch circuit 24 and the fourth branch circuit 34 are arranged in a same layer.

The thickness direction Z of the touch control panel 100 may be arranged parallel to a direction in which a plurality of film layers in the touch control panel 100 are stacked, and the thickness direction Z of the touch control panel 100 is described as the thickness direction Z below.

In some examples, the projection of the first branch circuit 23 along the thickness direction Z partially overlaps the projection of the second branch circuit 24 along the thickness direction Z. In some other examples, the projection of the first branch circuit 23 along the thickness direction Z overlaps the projection of the second branch circuit 24 along the thickness direction Z.

Further, each first touch control circuit 21 includes the first branch circuit 23 and the second branch circuit 24, and a projection of the first branch circuit 23 of the first touch control circuit 21 along the thickness direction Z at least partially overlaps a projection of the second branch circuit 24 of the first touch control circuit 21 along the thickness direction Z. Each second touch control circuit 22 includes the first branch circuit 23 and the second branch circuit 24, and a projection of the first branch circuit 23 of the second touch control circuit 22 along the thickness direction Z at least partially overlaps a projection of the second branch circuit 24 of the second touch control circuit 22 along the thickness direction Z.

In some examples, the projection of the third branch circuit 33 along the thickness direction Z partially overlaps the projection of the fourth branch circuit 34 along the thickness direction Z. In some other examples, the projection of the third branch circuit 33 along the thickness direction Z overlaps the projection of the fourth branch circuit 34 along the thickness direction Z.

Further, each first repair circuit 31 includes the third branch circuit 33 and the fourth branch circuit 34, and a projection of the third branch circuit 33 of the first repair circuit 31 along the thickness direction Z at least partially overlaps a projection of the fourth branch circuit 34 of the first repair circuit 31 along the thickness direction Z. Each second repair circuit 32 includes the third branch circuit 33 and the fourth branch circuit 34, a projection of the third branch circuit 33 of the second repair circuit 32 along the thickness direction Z at least partially overlaps a projection of the fourth branch circuit 34 of the second repair circuit 32 along the thickness direction Z.

In these optional embodiments, the branch circuits are provided to reduce the impedance of the first wiring 20 and the second wiring 30, so as to reduce the heat generated by the first wiring 20 and the second wiring 30 during operation, thereby increasing the use life of the first wiring 20 and the second wiring 30. The branch circuits are arranged in different conductor layers and overlap in the thickness direction Z to reduce the space occupied by the branch circuits in the routing area NA1, which reduces the space occupied by the routing area NA1 in the touch control panel 100, so as to improve the proportion of the touch control area AA in the touch control panel 100.

As shown in FIG. 1, in some optional embodiments, at least one of the plurality of touch control wirings includes a plurality of first wirings 20 and a plurality of second wirings 30, and in the routing area NA1, the plurality of first wirings 20 are located between the plurality of second wirings 30 and the touch control area AA.

For example, the first wiring 20 includes the first touch control circuit 21, and the second wiring 30 includes the first repair circuit 31. In the routing area NA1, a plurality of first touch control circuits 21 are distributed in sequence, a plurality of first repair circuits 31 are distributed in sequence, a preset blank area is provided between the touch control area AA and a side of the plurality of first repair circuits 31 close to the touch control area AA, and the plurality of first touch control circuits 21 are arranged in the preset blank area.

In the embodiments of the present application, the above arrangement is beneficial for increasing the spacing between the first wiring 20 and the second wiring 30, which not only reduces the possibility of the interference between the first wiring 20 and the second wiring 30 due to process errors in the manufacturing process of the first wiring 20 and the second wiring 30, but also reduces the effects of the first wiring 20 on the manufacturing of the second wiring 30 when a fault occurs in the manufacturing process of the first wiring 20.

As shown in FIGS. 1, 3, and 4, in some optional embodiments, the routing area NA1 includes a first overlapping area CR1, and in the first overlapping area CR1, a projection of the first wiring 20 along the thickness direction Z overlaps a projection of the second wiring 30 along the thickness direction Z, one of the first branch circuit 23 and the second branch circuit 24 is reused as a first bridge portion K1, the other of the first branch circuit 23 and the second branch circuit 24 is electrically connected with the first bridge portion K1 through a via, one of the third branch circuit 33 and the fourth branch circuit 34 is reused as a second bridge portion K2, and the other of the third branch circuit 33 and the fourth branch circuit 34 is electrically connected with the second bridge portion K2 through a via. Herein, the first bridge portion K1 and the second bridge portion K2 are respectively arranged in different layers.

In the first overlapping area CR1, the projection of the first wiring 20 along the thickness direction Z overlaps the projection of the second wiring 30 along the thickness direction Z. That is, a projection of the first bridge portion K1 along the thickness direction Z overlaps a projection of the second bridge portion K2 along the thickness direction Z.

It can be seen from the foregoing that in the routing area NA1, the plurality of first wirings 20 are located between the plurality of second wirings 30 and the touch control area AA. One end of the second wiring 30 electrically connected with the touch control electrode, when extending in the routing area NA1, needs to cross the first wiring 20. The area in which the first wiring 20 needs to be crossed is the first overlapping area CR1, which means that the projection of the first wiring 20 along the thickness direction Z overlaps the projection of the second wiring 30 along the thickness direction Z. Moreover, in the first overlapping area CR1, one of the first branch circuit 23 and the second branch circuit 24 is the first bridge portion K1, the other of the first branch circuit 23 and the second branch circuit 24 is broken into two separate portions in the first overlapping area CR1, and the first bridge portion K1 connects the two separate portions through a via. For example, the first branch circuit 23 is reused as the first bridge portion K1 in the first overlapping area CR1, the second branch circuit 24 is broken into two portions in the first overlapping area CR1, and each of the two portions is electrically connected with the first bridge portion K1 through a via so that the two portions are connected. It can be understood that the first branch circuit 23 is reused as the first bridge portion K1 in the first overlapping area CR1, and the first branch circuit 23 is also used for electrical connection of the first branch circuit 23 in the first overlapping area CR1. Moreover, in the first overlapping area CR1, one of the third branch circuit 33 and the fourth branch circuit 34 is the second bridge portion K2, the other of the third branch circuit 33 and the fourth branch circuit 34 is broken into two separate portions in the first overlapping area CR1, and the second bridge portion K2 connects the two separate portions through a via. For example, the fourth branch circuit 34 is reused as the second bridge portion K2 in the first overlapping area CR1, the third branch circuit 33 is broken into two portions in the first overlapping area CR1, and each of the two portions is electrically connected with the second bridge portion K2 through a via so that the two portions are connected. It can be understood that the fourth branch circuit 34 is reused as the second bridge portion K2 in the first overlapping area CR1, and the fourth branch circuit 34 is also used for electrical connection of the fourth branch circuit 34 in the first overlapping area CR1.

The first bridge portion K1 and the second bridge portion K2 are respectively arranged in different layers. That is, the first bridge portion K1 may be located in the first conductor layer M1, and the second bridge portion K2 may be located in the second conductor layer M2, which is not particularly limited in the embodiments of the present application as long as it can be ensured that the first bridge portion K1 and the second bridge portion K2 are located in different layers.

In the embodiments of the present application, the plurality of first wirings 20 are located between the plurality of second wirings 30 and the touch control area AA, the first wiring 20 includes the first branch circuit 23 and the second branch circuit 24, and the second wiring 30 includes the third branch circuit 33 and the fourth branch circuit 34, so that an overlapping area is formed between the first wiring 20 and the second wiring 30 in the routing area NA1. The first overlapping area CR1, the first bridge portion K1, and the second bridge portion K2 are provided, which is beneficial for achieving the routing of the first wiring 20 and the second wiring 30 in the overlapping area, reducing the impedance of the first wiring 20 and the second wiring 30, and meanwhile reducing the difficulty in the arrangement of the first wiring 20 and the second wiring 30 in the first overlapping area CR1 and improving the manufacturing yield of the first wiring 20 and the second wiring 30.

Figures 5, 6:
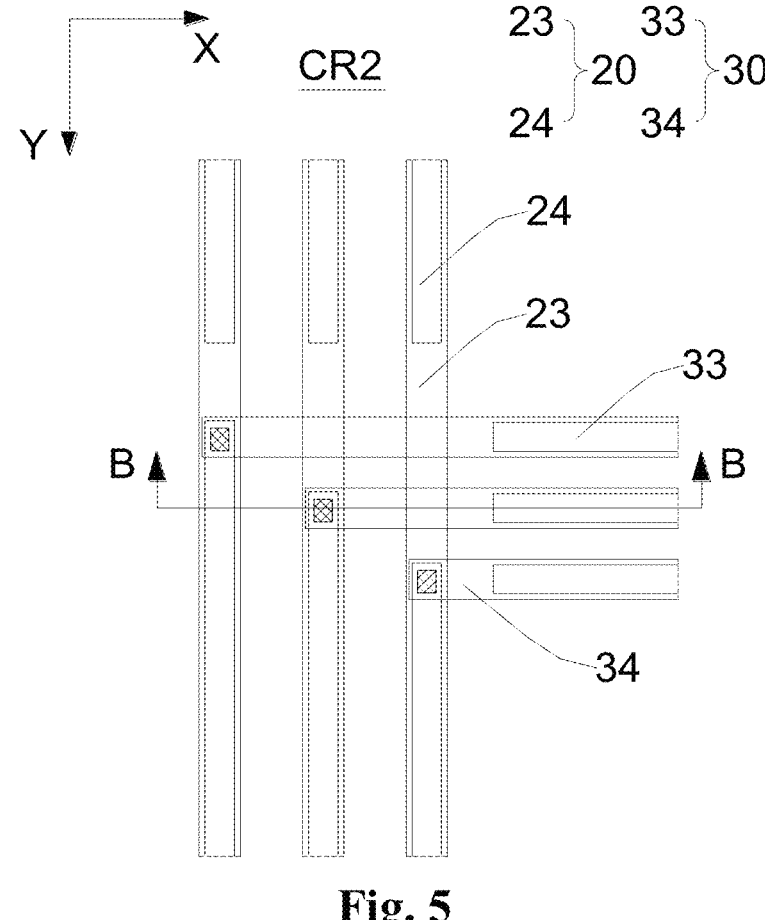
FIG. 5 shows an enlarged schematic structural view of Q in FIG. 1.
FIG. 6 shows a sectional schematic structural view along B-B in FIG. 5.

FIG. 5 shows an enlarged schematic structural view of Q in FIG. 1. FIG. 6 shows a sectional schematic structural view along B-B in FIG. 5.

As shown in FIGS. 1, 5, and 6, in some optional embodiments, the binding area NA2 includes a second overlapping area CR2, and in the second overlapping area CR2, the projection of the first wiring 20 along the thickness direction Z overlaps the projection of the second wiring 30 along the thickness direction Z, one of the first branch circuit 23 and the second branch circuit 24 is reused as a third bridge portion K3, the other of the first branch circuit 23 and the second branch circuit 24 is electrically connected with the third bridge portion K3 through a via, one of the third branch circuit 33 and the fourth branch circuit 34 is reused as a fourth bridge portion K4, and the other of the third branch circuit 33 and the fourth branch circuit 34 is electrically connected with the fourth bridge portion K4 through a via. The third bridge portion K3 and the fourth bridge portion K4 are respectively arranged in different layers.

In the second overlapping area CR2, the projection of the first wiring 20 along the thickness direction Z overlaps the projection of the second wiring 30 along the thickness direction Z. That is, a projection of the third bridge portion K3 along the thickness direction Z overlaps a projection of the fourth bridge portion K4 along the thickness direction Z.

It can be seen from the foregoing that the second wiring 30 extends through the first overlapping area CR1 to a side of the first wiring 20 away from the touch control area AA, and the second overlapping area CR2 is provided for the second wiring 30 in the binding area NA2 to electrically connect the second wiring 30 with the first wiring 20 located in the binding area NA2. Both the plurality of first wirings 20 and the plurality of second wirings 30 are arranged in sequence. For example, the first wiring 20 is the first touch control circuit 21, the second wiring 30 is the first repair circuit 31, a first electrode group 11 at the side close to the binding area NA2 is a $1^{st}$ first electrode group 11, and a first electrode group 11 at the side away from the binding area NA2 is an $N^{th}$ first electrode group 11, a first touch control circuit 21 electrically connected with the $1^{st}$ first electrode group 11 is a $1^{st}$ first touch control circuit 21, a first touch control circuit 21 electrically connected with the $N^{th}$ first electrode group 11 is an $N^{th}$ first touch control circuit 21, and the $1^{st}$ first touch control circuit 21 to the $N^{th}$ first touch control circuit 21 may be distributed in sequence along a direction away from the touch control area AA in the routing area NA1. Accordingly, a $1^{st}$ first repair circuit 31 to an $N^{th}$ first repair circuit 31 may be distributed in sequence along the direction away from the touch control area AA in the routing area NA1, and the $1^{st}$ first repair circuit 31 is arranged adjacent to the $N^{th}$ first touch control circuit 21. In order to reduce a number of via connections, the $1^{st}$ first repair circuit 31 is electrically connected with the $1^{st}$ first touch control circuit 21, and in the second overlapping area CR2, the $1^{st}$ first repair circuit 31 needs to cross a $2^{nd}$ first touch control circuit 21 to the $N^{th}$ first touch control circuit 21. An $M^{th}$ first repair circuit 31 is electrically connected with an $M^{th}$ first touch control circuit 21, and the $M^{th}$ first repair circuit 31 needs to cross an $(M+1)^{th}$ first touch control circuit 21 to the $N^{th}$ first touch control circuit 21. M is less than N. The "cross" herein means that the projection of the first wiring 20 along the thickness direction Z overlaps the projection of the second wiring 30 along the thickness direction Z.

Further, in the second overlapping area CR2, one of the first branch circuit 23 and the second branch circuit 24 is the third bridge portion K3, the other of the first branch circuit 23 and the second branch circuit 24 is broken into two separate portions in the first overlapping area CR1, and the third bridge portion K3 connects the two separate portions through a via. For example, the first branch circuit 23 is reused as the third bridge portion K3 in the first overlapping area CR1, the second branch circuit 24 is broken into two portions in the first overlapping area CR1, and each of the two portions is electrically connected with the third bridge portion K3 through a via so that the two portions are connected. It can be understood that the first branch circuit 23 is reused as the third bridge portion K3 in the first overlapping area CR1, and the first branch circuit 23 is also used for electrical connection of the first branch circuit 23 in the first overlapping area CR1. Moreover, in the second overlapping area CR2, one of the third branch circuit 33 and the fourth branch circuit 34 is the fourth bridge portion K4, the other of the third branch circuit 33 and the fourth branch circuit 34 is broken into two separate portions in the first overlapping area CR1, and the fourth bridge portion K4 connects the two separate portions through a via. For example, the fourth branch circuit 34 is reused as the fourth bridge portion K4 in the first overlapping area CR1, the third branch circuit 33 is broken into two portions in the first overlapping area CR1, and each of the two portions is electrically connected with the fourth bridge portion K4 through a via so that the two portions are connected. It can be understood that the fourth branch circuit 34 is reused as the fourth bridge portion K4 in the first overlapping area CR1, the fourth branch circuit 34 is also used for electrical connection of the fourth branch circuit 34 in the first overlapping area CR1.

The third bridge portion K3 and the fourth bridge portion K4 are respectively arranged in different layers. That is, the third bridge portion K3 may be located in the first conductor layer M1, and the fourth bridge portion K4 may be located in the second conductor layer M2, which is not particularly limited in the embodiments of the present application as long as it can be ensured that the third bridge portion K3 and the fourth bridge portion K4 are located in different layers.

In the embodiments of the present application, the plurality of first wirings 20 are located between the plurality of second wirings 30 and the touch control area AA, the first wiring 20 includes the first branch circuit 23 and the second branch circuit 24, and the second wiring 30 includes the third branch circuit 33 and the fourth branch circuit 34, so that an overlapping area is formed between the first wiring 20 and the second wiring 30 in the binding area NA2. The second overlapping area CR2, the third bridge portion K3, and the fourth bridge portion K4 are provided, which is beneficial for achieving the routing of the first wiring 20 and the second wiring 30 in the overlapping area, reducing the impedance of the first wiring 20 and the second wiring 30, and meanwhile reducing the difficulty in the arrangement of the first wiring 20 and the second wiring 30 in the second overlapping area CR2 and improving the manufacturing yield of the first wiring 20 and the second wiring 30.

As shown in FIGS. 4 and 6, in some optional embodiments, the first bridge portion K1 and the third bridge portion K3 are arranged in a same layer, and the second bridge portion K2 and the fourth bridge portion K4 are arranged in a same layer.

The first bridge portion K1 and the third bridge portion K3 are arranged in the same layer, and the second bridge portion K2 and the fourth bridge portion K4 are arranged in the same layer. That is, the first branch circuit 23 is reused as the first bridge portion K1, the third branch circuit 33 is reused as the third bridge portion K3, the second branch circuit 24 is reused as the second bridge portion K2, and the fourth branch circuit 34 is reused as the fourth bridge portion K4. Alternatively, the second branch circuit 24 is reused as the first bridge portion K1, the fourth branch circuit 34 is reused as the third bridge portion K3, the first branch circuit 23 is reused as the second bridge portion K2, and the third branch circuit 33 is reused as the fourth bridge portion K4.

In some alternative embodiments, the peripheral area NA further includes a third overlapping area, and in the third overlapping area, a projection of the second repair circuit 32 along the thickness direction Z overlaps a projection of the first touch control circuit 21 along the thickness direction Z. In the third overlap region, one of the first branch circuit 23 and the second branch circuit 24 of the first touch control circuit 21 is reused as a fifth bridge portion, the other of the first branch circuit 23 and the second branch circuit 24 is electrically connected with the fifth bridge portion through a via, and one of the third branch circuit 33 and the fourth branch circuit 34 of the second repair circuit 32 is reused as a sixth bridge portion, and the other of the third branch circuit 33 and the fourth branch circuit 34 is electrically connected with the sixth bridge portion through a via. Further, the peripheral area NA further includes a fourth overlapping area, and in the fourth overlapping area, the projection of the second repair circuit 32 along the thickness direction Z overlaps a projection of the second touch control circuit 22 along the thickness direction Z. In the fourth overlapping area, one of the first branch circuit 23 and the second branch circuit 24 of the second touch control circuit 22 is reused as a seventh bridge portion, the other of the first branch circuit 23 and the second branch circuit 24 is electrically connected with the seventh bridge portion through a via, and one of the third branch circuit 33 and the fourth branch circuit 34 of the second repair circuit 32 is reused as an eighth bridge portion, and the other of the third branch circuit 33 and the fourth branch circuit 34 is electrically connected with the eighth bridge portion through a via.

Optionally, the fifth bridge portion and the seventh bridge portion are arranged in a same layer, and the sixth bridge portion and the eighth bridge portion are arranged in a same layer. Optionally, the first bridge portion K1 and the fifth bridge portion are arranged in a same layer, and the second bridge portion K2 and the sixth bridge portion are arranged in a same layer.

In these optional embodiments, the above arrangement is beneficial for simplifying the manufacturing process of the bridge portion, reducing the difficulty in the manufacturing of the bridge portion, and further improving the manufacturing yield of the touch control wiring.

Figure 7:
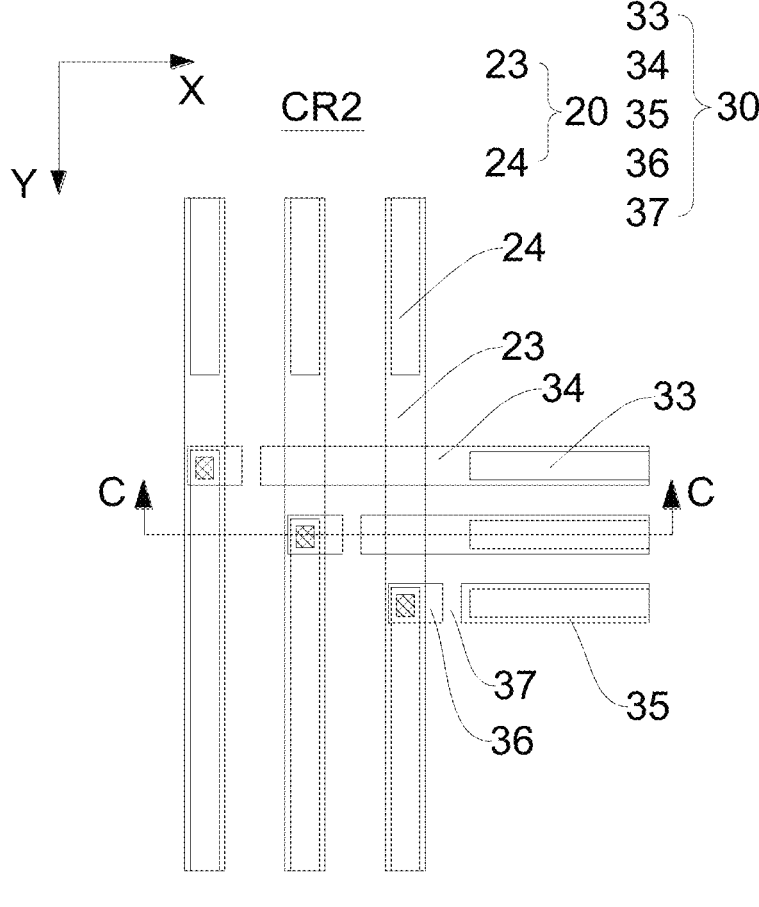
FIG. 7 shows another enlarged schematic structural view of Q in FIG. 1.
Figure 8:
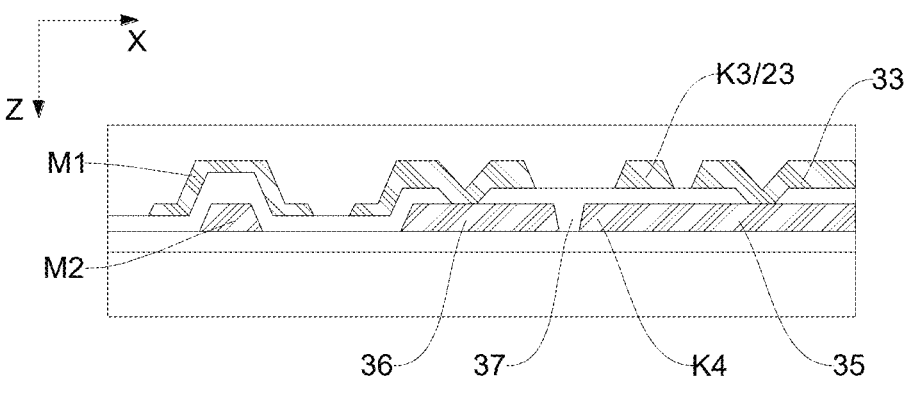
FIG. 8 shows a sectional schematic structural view along C-C in FIG. 7.

FIG. 7 shows another enlarged schematic structural view of Q in FIG. 1. FIG. 8 shows a sectional schematic structural view along C-C in FIG. 7.

As shown in FIGS. 7 and 8, in some optional embodiments, the second wiring 30 includes a first portion 35, a second portion 36, and a separation portion 37 located between the first portion 35 and the second portion 36, the first portion 35 is electrically connected with the touch control electrode, the second portion 36 is electrically connected with the first wiring 20 located in the binding area NA2, and the separation portion 37 separates the first portion 35 from the second portion 36.

The second wiring 30 includes the first portion 35, the second portion 36, and the separation portion 37. The first portion 35 is electrically connected with the touch control electrode and extends from the routing area NA1 to the binding area NA2, the second portion 36 is directly electrically connected with the first wiring 20 in the binding area NA2, and the second portion 36 and the first portion 35 are separated by the separation portion 37. Optionally, the separation portion 37 may be a recess separating the first portion 35 from the second portion 36 as two portions which are electrically insulated from each other. When the second wiring 30 is required to transmit a touch control signal, the separation portion 37 may be repaired manually to electrically connect the first portion 35 and the second portion 36. Optionally, the first portion 35 and the second portion 36 may be electrically connected by using a laser to catalyze a chemical reaction in a repair material. Optionally, the repair material includes tungsten hexacarbonyl (W (CO) 6).

In these optional embodiments, the separation portion 37 is provided, so that the second wiring 30 does not participate in the transmission of the touch control signal when the first wiring 20 can be used normally, thereby reducing the difficulty in the control of the control chip IC. Moreover, the first portion 35 and the second portion 36 are electrically connected by means of repair when a failure occurs in the first wiring 20, so that the second wiring 30 can transmit the touch control signal, so as to improve the manufacturing yield of the touch control wiring in the manufacturing process, thereby improving the reliability of the touch control wiring.

As shown in FIGS. 7 and 8, in some optional embodiments, the separation portion 37 is arranged at the fourth bridge portion K4.

It can be seen from the foregoing that both the first wiring 20 and the second wiring 30 include two layers of branch circuits in the peripheral area NA, and in the overlapping area, the second wiring 30 includes a single layer of branch circuits, i.e., the fourth bridge portion K4 includes a single layer of branch circuits. The separation portion 37 is arranged at the fourth bridge portion K4, i.e., the fourth bridge portion K4 is broken into the first portion 35 and the second portion 36 by the separation portion 37. Since the fourth bridge portion K4 includes a single layer of branch circuits, only one layer of branch circuits need to be repaired when the first portion 35 and the second portion 36 are repaired, so that the difficulty in the repair of the first portion 35 and the second portion 36 is reduced, thereby improving the reliability of the second wiring 30 after repair.

Figure 9:
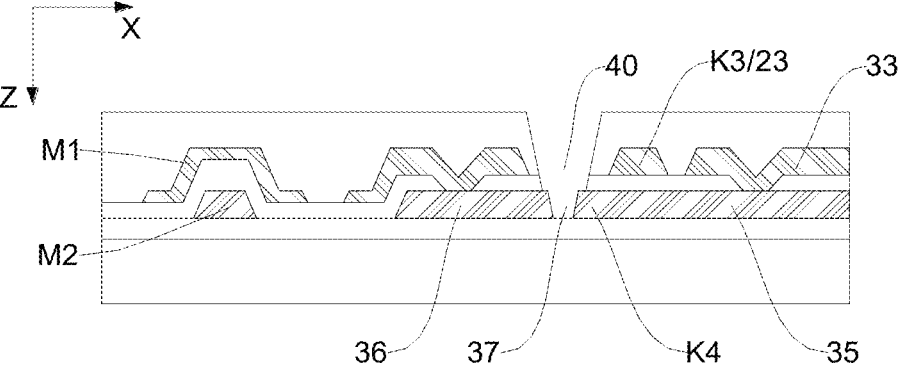
FIG. 9 shows another sectional schematic structural view along C-C in FIG. 7.

FIG. 9 shows another sectional schematic structural view along C-C in FIG. 7.

As shown in FIGS. 7 and 9, in some optional embodiments, the touch control panel 100 includes a recess 40 formed by recessing of the touch control panel 100 along the thickness direction of the touch control panel Z, and the recess 40 exposes the separation portion 37 and at least a portion of the first portion 35 and at least a portion of the second portion 36.

Optionally, the recess 40 may be recessed from the outer surface of the touch control panel 100 to a preset position to expose the separation portion 37. Further, the touch control panel 100 may include a touch control surface and a mounting surface which is opposite to the touch control surface along the thickness direction Z and configured to be mounted on the display panel 200. The recess 40 may be recessed from the mounting surface to the preset position, and of course, the recess 40 may also be recessed from the touch control surface to the preset position.

In these optional embodiments, the recess 40 is provided, so that the touch control panel 100 can still be repaired after a fault occurs in the touch control wiring in the touch control panel 100 when the manufacturing is completed and the function detection is performed on the touch control panel 100, so as to reduce the risk that the effects of other functions in the touch control panel 100 deteriorate due to the damaging of the manufactured film layers of the touch control panel 100, further improve the manufacturing yield of the touch control panel 100, and improve the reliability of the touch control panel 100.

FIG. 10 shows a schematic structural top view of another touch control panel according to some embodiments of the present application.

As shown in FIG. 10, in some optional embodiments, at least one of the plurality of touch control wirings includes a plurality of first wirings 20 and a plurality of second wirings 30, and a first wiring 20 and a second wiring 30 that are electrically connected with a same touch control electrode group 10 are arranged adjacent to each other in the routing area NA1.

For example, the touch control electrode group 10 includes a plurality of first electrode groups 11 arranged in sequence along the second direction Y, each of the first electrode groups 11 may be connected with the first wiring 20 and the second wiring 30, the first wiring 20 and the second wiring 30 for each of the first electrode groups 11 are electrically connected with a same first touch control electrode 111 in the first electrode group 11 and extend to the routing area NA1, and in the routing area NA1, the first wiring 20 and the second wiring 30 for each of the first electrode groups 11 are arranged adjacent to each other.

In these optional embodiments, the above arrangement is provided so that extension lengths of the first wiring 20 and the second wiring 30 that are electrically connected with the same touch control electrode group 10 are similar, which improves the uniformity between the impedance of the first wiring 20 and the impedance of the second wiring 30, thereby improving the uniformity between effects of the transmission of the touch control signal by the first wiring 20 and the second wiring 30.

In some optional embodiments, the first wiring and the second wiring are respectively arranged in the first conductor layer and the second conductor layer.

Optionally, the first wiring is located in the first conductor layer, and the second wiring is located in the second conductor layer. Alternatively, the first wiring is located in the second conductor layer, and the second wiring is located in the first conductor layer.

In these optional embodiments, the first wiring and the second wiring are respectively arranged in different conductor layers, which is beneficial for simplifying the routing solution of the first wiring and the second wiring in the peripheral area, and reducing the risk that a fault such as a short circuit or an open circuit occurs in the touch control wiring due to wire replacement.

As shown in FIG. 5, in some optional embodiments, the second wiring 30 is electrically connected with the first wiring 20 located in the binding area NA2. That is, the second wiring 30 and the first wiring 20 are always electrically connected with the control chip IC, and a control program in the control chip IC may control the touch control signal to be transmitted via the first wiring 20 or the second wiring 30, thereby reducing the difficulty in the repair of the second wiring 30 when a fault occurs in the first wiring 20.

FIG. 11 shows a schematic structural diagram of a display panel according to some embodiments of the present application.

In a second aspect, as shown in FIGS. 11, the embodiments of the present application further provide a display panel 200, including a base plate 50, a display layer 60, and any of the touch control panels 100 described above. The display layer 60 is located at a side of the base plate 50, and the touch control panel 100 is located at a side of the display layer 60 away from the base plate 50.

Since the display panel 200 according to the embodiments of the present application includes the display panel 100 according to any one of the above embodiments, the display panel 200 according to the embodiments of the present application has the beneficial effects of the touch control panel 100 according to any one of the above embodiments, which is not be repeated herein.

Optionally, the base plate 50 may include an array base plate 50, a backlight base plate 50, or other base plates 50.

Optionally, the display layer 60 may include a light-emitting unit, such as an anode layer, a light-emitting layer, and a cathode layer that are stacked in sequence. Of course, the display layer 60 may further include a liquid crystal layer, which is not particularly limited in the embodiments of the present application as long as the normal display of the display panel 200 can be ensured.

In a third aspect, the embodiments of the present application further provide a display apparatus. The display apparatus includes any of the display panels 200 described above.

FIG. 12 shows a flow chart of a method for repairing the touch control panel according to some embodiments of the present application.

In a fourth aspect, as shown in FIG. 12, the embodiments of the present application further provide a method for repairing any of the touch control panels 100 described above. The method includes the following steps.

S100, detecting the first wiring 20 of the touch control panel 100 to acquire detection information.

Specifically, the function of the first wiring 20 may be detected by a detection apparatus. Optionally, the detection apparatus may also detect the function of the second wiring 30 to determine whether the function of the second wiring 30 can be used normally.

S200, disconnecting the first wiring 20 located in the routing area NA1 and electrically connecting the second wiring 30 with the first wiring 20 located in the binding area NA2 when the detection information includes at least one of short circuit fault information or open circuit fault information.

Specifically, the first wiring 20 in the routing area NA1 may be disconnected by a laser or other means when the detection information includes at least one of short circuit fault information or open circuit fault information, so as to reduce the risk that the use life of the touch control panel 100 is reduced due to the heating of the first wiring 20 when current passes in the first wiring 20 in which a fault occurs. Moreover, the second wiring 30 is electrically connected with the first wiring 20 in the binding area NA2, so that signals can be transmitted between the control chip IC and the touch control electrode, so as to achieve the touch control function.

As shown in FIGS. 7 and 8, in some optional embodiments, the second wiring 30 includes a first portion 35, a second portion 36, and a separation portion 37, the first portion 35 is electrically connected with the touch control electrode, the second portion 36 is electrically connected with the first wiring 20 located in the binding area NA2, and the separation portion 37 separates the first portion 35 from the second portion 36. The electrically connecting the second wiring 30 with the first wiring 20 located in the binding area NA2 includes:

S210, connecting the first portion 35 with the second portion 36, so that the second wiring 30 is electrically connected with the first wiring 20 located in the binding area NA2.

In this embodiment, the same contents as in any one of the above embodiments are not repeated, and the differences are mainly described. Specifically, the first portion 35 and the second portion 36 that are separated from each other may be connected by welding or other means, to electrically connect the second wiring 30 with the first wiring 20 located in the binding area NA2.

As shown in FIGS. 5 and 6, in some optional embodiments, the touch control panel 100 further includes a control chip IC and a switch transistor, the control chip IC is electrically connected with the touch control wiring, and the switch transistor is provided between the first wiring 20 located in the binding area NA2 and the second wiring 30. The electrically connecting the second wiring 30 with the first wiring 20 located in the binding area NA2 includes:

S220, turning on the switch transistor when a control signal output by the control chip IC is an enable signal, so that the second wiring 30 is electrically connected with the first wiring 20 located in the binding area NA2.

Specifically, the touch control panel 100 includes the control chip IC and the switch transistor, and the control chip IC may be electrically connected with the touch control electrode through the touch control wiring. The switch transistor may be configured to control the connection or disconnection between the second wiring 30 and the first wiring 20 located in the binding area NA2. When the detection information includes at least one of short circuit fault information and open circuit fault information, the control chip IC outputs an enable signal to turn on the switch transistor, so that the second wiring 30 is electrically connected with the first wiring 20 located in the binding area NA2, and signals can be transmitted between the control chip IC and the touch control electrode through the second wiring 30.

Although the present application has been described with reference to the preferred embodiments, various modifications can be made thereto and components thereof can be replaced with their equivalents without departing from the scope of the present application. In particular, various technical features described in various embodiments can be combined in any manner as long as there is no structural conflict. The present application is not limited to the specific embodiments described herein, and includes all technical solutions that fall within the scope of the claims.

What is claimed is:

1. A touch control panel, comprising a touch control area and a peripheral area surrounding the touch control area, the peripheral area comprising a routing area arranged around the touch control area and a binding area located at a side of the routing area away from the touch control area, and the touch control panel further comprising:

a plurality of touch control electrode groups arranged in the touch control area, each of the touch control electrode groups comprising one or more touch control electrodes; and a plurality of touch control wirings arranged in the peripheral area, each of the touch control electrode groups being connected with a device external to the touch control electrode group through the touch control wiring, at least one of the plurality of touch control wirings comprising a first wiring and a second wiring, the first wiring being electrically connected with a touch control electrode group corresponding to the first wiring, the second wiring being electrically connected with a touch control electrode group corresponding to the second wiring, the first wiring extending from the routing area to the binding area, the second wiring extending from the routing area to the binding area, and the second wiring being configured to be electrically connected with the first wiring located in the binding area, wherein each of the plurality of touch control electrode groups comprises a first electrode group and a second electrode group, the first electrode group comprises one or more first touch control electrodes, the second electrode group comprises one or more second touch control electrodes, the first touch control electrode and the second touch control electrode are electrically insulated from each other, the first wiring comprises a first touch control circuit and a second touch control circuit, and the second wiring comprises a first repair circuit and a second repair circuit, wherein the first touch control circuit is electrically connected with the first electrode group, and the second touch control circuit is electrically connected with the second electrode group;

the first repair circuit is electrically connected with at least a portion of the first electrode group, and the first repair circuit is configured to be electrically connected with the first touch control circuit located in the binding area; and/or the second repair circuit is electrically connected with at least a portion of the second electrode group, and the second repair circuit is configured to be electrically connected with the second touch control circuit located in the binding area.

2. The touch control panel according to claim 1, wherein the first electrode group comprises a plurality of first touch control electrodes connected with each other, the plurality of first touch control electrodes are distributed in sequence along a first direction, the second electrode group comprises a plurality of second touch control electrodes connected with each other, the plurality of second touch control electrodes are distributed in sequence along a second direction, a plurality of first electrode groups are distributed at intervals along the second direction, a plurality of second electrode groups are distributed at intervals along the first direction and are spaced apart from the plurality of first electrode groups, and the first direction intersects with the second direction;

wherein the binding area is located at a side of the touch control area along the second direction, the second touch control circuit is electrically connected with a second touch control electrode at a side close to the binding area, and the second repair circuit is electrically connected with a second touch control electrode at a side away from the binding area.

3. The touch control panel according to claim 2, wherein both sides of each of the first electrode groups along the first direction are provided with the first touch control circuit and the first repair circuit.

4. The touch control panel according to claim 2, wherein one side of each of the first electrode groups along the first direction is provided with the first touch control circuit, and the other side is provided with the first repair circuit.

5. The touch control panel according to claim 1, wherein the touch control panel comprises a first conductor layer and a second conductor layer that are stacked;

the first wiring is arranged in at least one of the first conductor layer or the second conductor layer, and/or the second wiring is arranged in at least one of the first conductor layer or the second conductor layer.

6. The touch control panel according to claim 5, wherein the first wiring and the second wiring are respectively arranged in the first conductor layer and the second conductor layer.

7. A touch control panel, comprising a touch control area and a peripheral area surrounding the touch control area, the peripheral area comprising a routing area arranged around the touch control area and a binding area located at a side of the routing area away from the touch control area, and the touch control panel further comprising:

a plurality of touch control electrode groups arranged in the touch control area, each of the touch control electrode groups comprising one or more touch control electrodes; and a plurality of touch control wirings arranged in the peripheral area, each of the touch control electrode groups being connected with a device external to the touch control electrode group through the touch control wiring, at least one of the plurality of touch control wirings comprising a first wiring and a second wiring, the first wiring being electrically connected with a touch control electrode group corresponding to the first wiring, the second wiring being electrically connected with a touch control electrode group corresponding to the second wiring, the first wiring extending from the routing area to the binding area, the second wiring extending from the routing area to the binding area, and the second wiring being configured to be electrically connected with the first wiring located in the binding area, wherein the touch control panel comprises a first conductor layer and a second conductor layer that are stacked; the first wiring is arranged in at least one of the first conductor layer or the second conductor layer, and/or the second wiring is arranged in at least one of the first conductor layer or the second conductor layer, wherein the first wiring comprises a first branch circuit and a second branch circuit, the second wiring comprises a third branch circuit and a fourth branch circuit, both the first branch circuit and the third branch circuit are arranged in the first conductor layer, and both the second branch circuit and the fourth branch circuit are arranged in the second conductor layer;

wherein a projection of the first branch circuit along a thickness direction of the touch control panel at least partially overlaps a projection of the second branch circuit along the thickness direction of the touch control panel, and a projection of the third branch circuit along the thickness direction of the touch control panel at least partially overlaps a projection of the fourth branch circuit along the thickness direction of the touch control panel.

8. The touch control panel according to claim 7, wherein at least one of the plurality of touch control wirings comprises a plurality of first wirings and a plurality of second wirings, and the plurality of first wirings are located between the plurality of second wirings and the touch control area in the routing area.

9. The touch control panel according to claim 8, wherein the routing area comprises a first overlapping area, and in the first overlapping area, a projection of the first wiring along the thickness direction overlaps a projection of the second wiring along the thickness direction, one of the first branch circuit and the second branch circuit is reused as a first bridge portion, the other of the first branch circuit and the second branch circuit is electrically connected with the first bridge portion through a via, one of the third branch circuit and the fourth branch circuit is reused as a second bridge portion, and the other of the third branch circuit and the fourth branch circuit is electrically connected with the second bridge portion through a via;

wherein the first bridge portion and the second bridge portion are respectively arranged in different layers.

10. The touch control panel according to claim 9, wherein the binding area comprises a second overlapping area, and in the second overlapping area, the projection of the first wiring along the thickness direction overlaps the projection of the second wiring along the thickness direction, one of the first branch circuit and the second branch circuit is reused as a third bridge portion, the other of the first branch circuit and the second branch circuit is electrically connected with the third bridge portion through a via, one of the third branch circuit and the fourth branch circuit is reused as a fourth bridge portion, and the other of the third branch circuit and the fourth branch circuit is electrically connected with the fourth bridge portion through a via;

wherein the third bridge portion and the fourth bridge portion are respectively arranged in different layers.

11. The touch control panel according to claim 10, wherein the first bridge portion and the third bridge portion are arranged in a same layer, and the second bridge portion and the fourth bridge portion are arranged in a same layer.

12. The touch control panel according to claim 10, wherein the second wiring comprises a first portion, a second portion, and a separation portion located between the first portion and the second portion, the first portion is electrically connected with the touch control electrode, the second portion is electrically connected with the first wiring located in the binding area, and the separation portion separates the first portion from the second portion.

13. The touch control panel according to claim 12, wherein the separation portion is arranged at the fourth bridge portion.

14. The touch control panel according to claim 12, wherein the touch control panel comprises a recess formed by recessing of the touch control panel along the thickness direction of the touch control panel, and the recess exposes the separation portion and at least a portion of the first portion and at least a portion of the second portion.

15. The touch control panel according to claim 7, wherein at least one of the plurality of touch control wirings comprises a plurality of first wirings and a plurality of second wirings, and a first wiring and a second wiring that are electrically connected with a same touch control electrode group are arranged adjacent to each other in the routing area.

16. A method for repairing the touch control panel according to claim 7, comprising: detecting the first wiring of the touch control panel to acquire detection information; disconnecting the first wiring located in the routing area and electrically connecting the second wiring with the first wiring located in the binding area when the detection information comprises at least one of short circuit fault information or open circuit fault information.

17. The method according to claim 16, wherein the second wiring comprises a first portion, a second portion, and a separation portion, the first portion is electrically connected with the touch control electrode, the second portion is electrically connected with the first wiring located in the binding area, and the separation portion separates the first portion from the second portion;

the electrically connecting the second wiring with the first wiring located in the binding area comprises:

connecting the first portion with the second portion, so that the second wiring is electrically connected with the first wiring located in the binding area.

18. A method for repairing a touch control panel according to claim 1, the touch control panel comprising a touch control area and a peripheral area surrounding the touch control area, the peripheral area comprising a routing area arranged around the touch control area and a binding area located at a side of the routing area away from the touch control area, and the touch control panel further comprising:

a plurality of touch control electrode groups arranged in the touch control area, each of the touch control electrode groups comprising one or more touch control electrodes; and a plurality of touch control wirings arranged in the peripheral area, each of the touch control electrode groups being connected with a device external to the touch control electrode group through the touch control wiring, at least one of the plurality of touch control wirings comprising a first wiring and a second wiring, the first wiring being electrically connected with a touch control electrode group corresponding to the first wiring, the second wiring being electrically connected with a touch control electrode group corresponding to the second wiring, the first wiring extending from the routing area to the binding area, the second wiring extending from the routing area to the binding area, and the second wiring being configured to be electrically connected with the first wiring located in the binding area, wherein the method comprises:

detecting the first wiring of the touch control panel to acquire detection information;

disconnecting the first wiring located in the routing area and electrically connecting the second wiring with the first wiring located in the binding area when the detection information comprises at least one of short circuit fault information or open circuit fault information.

19. The method according to claim 18, wherein the second wiring comprises a first portion, a second portion, and a separation portion, the first portion is electrically connected with the touch control electrode, the second portion is electrically connected with the first wiring located in the binding area, and the separation portion separates the first portion from the second portion;

the electrically connecting the second wiring with the first wiring located in the binding area comprises:

connecting the first portion with the second portion, so that the second wiring is electrically connected with the first wiring located in the binding area.

20. The method according to claim 18, wherein the touch control panel further comprises a control chip and a switch transistor, the control chip is electrically connected with the touch control wiring, and the switch transistor is provided between the first wiring located in the binding area and the second wiring; and the electrically connecting the second wiring with the first wiring located in the binding area comprises:

turning on the switch transistor when a control signal output by the control chip is an enable signal, so that the second wiring is electrically connected with the first wiring located in the binding area.

* * * * *